United States Patent [19]
Birleson

[11] 3,969,726
[45] July 13, 1976

[54] TWO CHANNEL MONOPULSE RECEIVER

[75] Inventor: S. Vincent Birleson, Garland, Tex.

[73] Assignee: Texas Instruments Incorporated, Dallas, Tex.

[22] Filed: Feb. 27, 1975

[21] Appl. No.: 553,394

[52] U.S. Cl. ............................................. 343/16 M
[51] Int. Cl.² .......................................... G01S 9/22
[58] Field of Search ................................. 343/16 M

[56] References Cited
UNITED STATES PATENTS

| | | | |
|---|---|---|---|
| 3,153,234 | 10/1964 | Begeman et al. | 343/16 M |
| 3,680,102 | 7/1972 | Poinsard | 343/16 M |
| 3,860,929 | 1/1975 | Crain | 343/16 M X |

Primary Examiner—T.H. Tubbesing
Attorney, Agent, or Firm—Harold Levine; Rene' E. Grossman; Alva H. Bandy

[57] ABSTRACT

Disclosed is a simple two channel monopulse receiver in which Σ and Δ inputs are first fed to a hybrid to generate equal amplitude signals, A and B. The A and B signals are hard limited and then phase compared to provide a direction indication valid for angles within two beamwidths. The limited A and B signals are also fed to a second hybrid to generate new Σ and Δ signals at a new amplitude level. These two outputs of the second hybrid are amplitude detected and substracted by a differential amplifier to provide an output proportional to angle from boresight. The two output signals together provide unambiguous indication of the direction and angle off boresight for targets up to two antenna beamwidths off boresight.

12 Claims, 2 Drawing Figures

TWO CHANNEL MONOPULSE RECEIVER

This invention relates to tracking radar receivers and more particularly to monopulse tracking radar receivers.

Monopulse receivers have long been used in tracking radars to provide complete information as to location of a radar target from a single return signal from that target. For each direction being determined, that is, elevation and azimuth, the monopulse radar antenna provides a sum and a difference output. The sum output is a maximum for targets on boresight and decrease as the target moves away from boresights. and decreases as the target moves away from boresight. The difference output is typically zero for targets on boresight and increases in amplitude as the target moves from boresight. Antenna beamwidth in monopulse systems is normally defined as the angle at which the sum and difference signals are of equal amplitude. The difference signal reaches a peak value beyond this equal amplitude, or cross over, point and decreases rapidly as the angle increases beyond two beamwidths. The relative phase of the difference signal also changes as the target moves from one side of boresight to the other.

Many circuits have been designed for converting the sum and difference signals into an electrical output proportional to the angular location of a target with respect to boresight. Such an electrical output is typically used to change the position of the radar antenna so that it tracks the target or to guide a missile which is pursuing the target. One very simple receiver, which is often used for this reason, consists of a hybrid, two limiter amplifiers and a phase detector. In this receiver the sum and difference signals are fed to the hybrid to generate equal amplitude signals whose phase difference is related to the angle off boresight of the target. These signals are hard limited and phase detected to provide an output proportional to the location of the target. The output of this receiver is ambiguous for targets outside of one antenna beamwidth and is linear for only a small portion of the area inside one beamwidth.

Logarithmic receivers have also been provided in which the sum and difference signals are logarithmically detected and then subtracted to provide the ratio of these signals. To provide a linear output, the ratio signal must be amplified by an antilog circuit. While this type of receiver avoids the use of hybrids and provides wide dynamic range without the use of limiter amplifiers, inaccuracies in the log and antilog circuits produce dynamic errors which cannot be zeroed out.

A three channel phase comparison receiver has been used to avoid some of the problems of earlier receivers but at the cost of increased complexity. In this receiver, the sum and difference signals are fed to a first hybrid to produce first and second signals of equal amplitude whose phase is related to target location as in the earlier phase comparison receivers. These two signals are fed to a second hybrid to provide a third signal which is essentially the sum signal shifted by 90°. These three signals are each hard limited and the limited phase shifted sum signal is used to phase detect each of the first two signals. The outputs of the phase detectors are then subtracted to provide a video output proportional to target angle from boresight.

Accordingly, an object of the present invention is to provide an improved monopulse receiver.

Another object of the present invention is to provide a monopulse receiver having an output which is unambiguous and substantially linear for target positions up to two beamwidths.

Another object of the present invention is to provide a simple and inexpensive monopulse receiver.

According to the present invention, the sum and difference signals are coupled to a hybrid which provides equal amplitude signals whose phase difference is proportional to target location. Each of these two signals is fed to a limiter amplifier where it is amplified and hard limited. The limiter amplifier outputs are fed to a second hybrid to generate two signals related in amplitude to the original sum and difference signals, but phase shifted therefrom. The outputs of the second hybrid are fed to amplitude detectors and the detected outputs are fed to the inputs of a differential amplifier. The output of the differential amplifier indicates the angle from boresight of the target.

Other objects, features and advantages of this invention will be better understood by reference to the following detailed description when read in conjunction with the accompanying drawings wherein.

Figure 1:
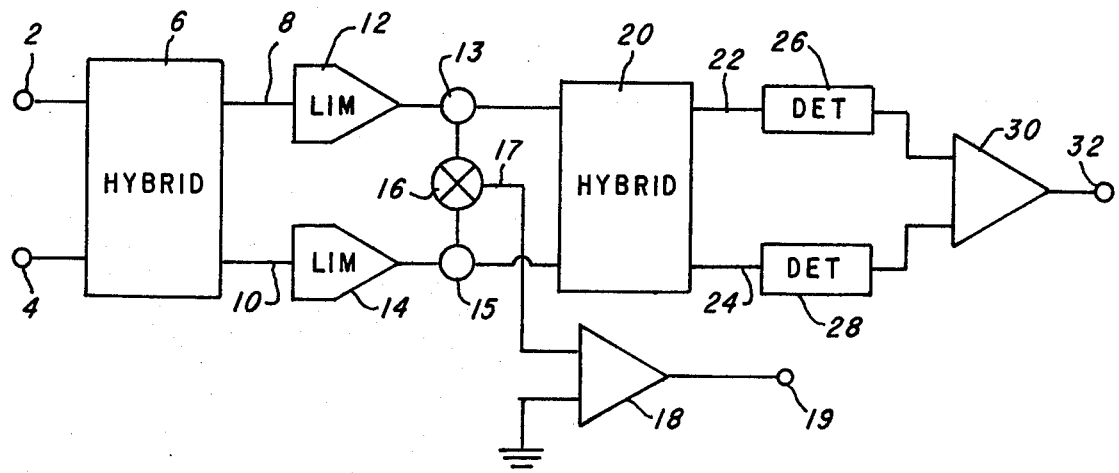
FIG. 1 is a block diagram of a monopulse receiver according to the present invention.

Referring to FIG. 1, a monopulse receiver according to the present invention, has two inputs, 2 and 4, for receiving sum and difference inputs respectively from a monopulse antenna. The term $\Sigma$ will be used to represent the sum signal and the term $\Delta$ will be used to represent the difference signal according to the common practice in the monopulse radar art. The $\Sigma$ signal is coupled from input 2 to a first input of a hybrid 6 and the $\Delta$ signal is coupled from input 4 to a second input of hybrid 6. Hybrid 6 may be, for example, Merrimac Corp. type QH-3-60 90° hybrid. Hybrid 6 phase shifts and combines the two input signals to provide the signal $(\Sigma+j\Delta)$ at output 8 and the signal $(\Delta+j\Sigma)$ at output 10. Hybrid 6 is commonly referred to as a 90° hybrid since it provides a 90° phase shift to the input signals and is used in the preferred embodiment where the $\Sigma$ and $\Delta$ inputs are either in phase or 180° out of phase, depending upon the location of the target with respect to antenna boresight. Some monopulse antennas provide $\Sigma$ and $\Delta$ outputs which are either +90° or −90° out of phase with each other. If such an antenna were used either a 180° hybrid would be substituted for hybrid 6 or a 90° phase shifter would be inserted in the $\Delta$ input line.

The signals at the outputs 8 and 10 of hybrid 6 are of equal amplitude but have a phase difference related to the amplitude difference between the original input signals $\Sigma$ and $\Delta$. The amplitude of the signal outputs of hybrid 6 does vary with the amplitudes of the $\Sigma$ and $\Delta$ signals received from the antenna. These signals are often very low level, but have a wide range of amplitude variation. To provide a constant amplitude receiver signal, the outputs 8 and 10 of hybrid 6 are coupled to limiter amplifiers 12 and 14, respectively. Limiter amplifiers 12 and 14 provide a constant amplitude output signal in response to input signals having a wide range of amplitudes while preserving the phase difference. The target location information, which was contained in the phase difference between the outputs of hybrid 6 is therefore also present in the phase difference between the outputs of limiter amplifiers 12 and 14 but the signals are at a constant amplitude which is typically much higher than the output of hybrid 6. Limiters 12 and 14 may be, for example, a matched pair sold by RGH Electronics Laboratory Inc., of Deer Park, N.Y. having the part number ICSLM6010.

The outputs of limiter amplifiers 12 and 14 are coupled through signal splitters 13 and 15, respectively, to a phase detector 16. The output 17 of detector 16 is coupled to one input of a comparator 18. The other input of comparator 18 is coupled to ground. The signal at output 19 of comparator 18 is digital and indicates on which side of boresight the target is located. Within a narrow region around boresight and well within one beamwidth, the output 17 of phase comparator 16 actually provides a somewhat linear indication of the angle from boresight of the target location. This angle information is useless beyond one beamwidth since the same amplitude output occurs twice between boresight and a two beamwidth angle. But output 17 is unambiguous for angles up to two beamwidths as far as indicating the side of boresight on which the target is located; that is, for example, whether the target is right or left of boresight. For this reason in the preferred embodiment, output 17 is coupled to comparator 18 to provide only a left-right or up-down indication of target location at output 19. It is apparent that in some systems output 17 could be used additionally for angle information when the target is very near to boresight. Power splitters 13 and 15 may be, for example ANZAC Corp., of Waltham, Mass., type THV50. Phase detector 16 may be, for example, a Relcom Corp. type M6E. Comparator 18 may be, for example, a Texas Instruments Incorporated SN52810J.

The outputs of limiter amplifiers 12 and 14 are additionally coupled through splitters 13 and 15 to the inputs of a second hybrid 20, a 90° hybrid identical to the first hybrid 6. Hybrid 20 phase shifts and combines these two input signals to provide an output of $j\Delta'$ at output 22 and output of $j\Sigma'$ at output 24. The amplitudes of $\Delta'$ and $\Sigma'$ are different from the amplitudes of the original inputs, $\Sigma$ and $\Delta$ but the ratio $\Sigma/\Delta$ equals $\Sigma'/\Delta'$. The outputs 22 and 24 of hybrid 20 are coupled to amplitude detectors 26 and 28, respectively. Detectors 26 and 28 convert the outputs of hybrid 20 to video levels proportional to the amplitudes of $\Delta'$ and $\Sigma'$. The outputs of detectors 26 and 28 are coupled to the inputs of a differential amplifier 30. Amplifier 30 performs a subtraction function; that is, it provides a signal at an output 32 which is proportional to the difference between the two input signals. The signal at output 32 is substantially linearly proportional to the angle from boresight of the location of a target. Output 32 is more accurately defined by the equation:

$$V_o = 2 - (2 \cos \phi - 2 \sin \phi),$$

where $\phi = \tan^{-1}(\Sigma/\Delta)$.

The signal at output 32 does not indicate on which side of boresight the target is located and this information is obtained from output 19. In the preferred embodiment the monopulse receiver output is digitized. Output 19 provides the sign bit and output 32 is converted to a digital representation of the angle from boresight.

Amplifier 30 may be, for example, a Harris Semiconductor Corp. type HA 2522.

Figure 2:
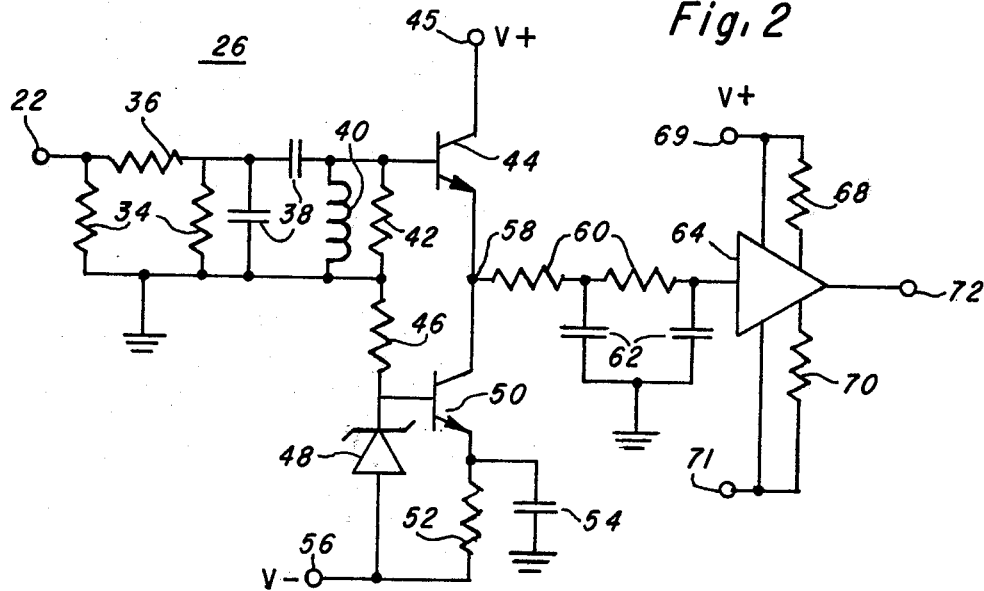
FIG. 2 is a schematic diagram of the amplitude detector 26 of FIG. 1.

FIG. 2 is a detailed schematic diagram of the preferred embodiment amplitude detectors 26 and 28. The two detectors are identical and only one is shown and is described as detector 26 for simplicity. Detector 26 has an input 22 coupled to an output of the hybrid 20 (FIG. 1). Resistors 34 and 36 coupled to input 22 provided a matched impedance load to the hybrid output. Capacitors 38 and inductor 40 provide impedance transformation between the hybrid output load resistors 34 and 36 and a resistor 42. Resistor 42 provides an optimum input impedance for the base of transistor 44. Positive voltage is supplied to the collector of transistor 44 through an input 45.

The emitter of transistor 44 is connected to a constant current source comprising resistors 46 and 52, diode 48, transistor 50 and capacitor 54. Resistor 46 and diode 48 provide a fixed reference voltage at the base of transistor 50 with respect to a negative voltage supply connected to an input 56. This reference voltage less one diode drop appears at the emitter of transistor 50 and therefore appears across resistor 52. A constant current is therefore caused to flow from the collector to the emitter of transistor 50 and through resistor 52.

The AC signal coupled to input 22 is detected by transistor 44 to generate a video pulse with some high frequency content at junction 58. Resistors 60 and capacitors 62 form a filter which removes the high frequency content and couples the video pulse to the input of a buffer amplifier 64. Amplifier 64 may be, for example, a National Semiconductor type NH 0002. Resistors 68 and 70 limit the current supplied from power supplies 69 and 71, respectively, to the output stage of amplifier 64. Output 72 provides a low impedance output which is coupled to an input of amplifier 30 (FIG. 1).

The preferred embodiment is designed to receive 60 Mhz IF signals and the parts listed are designed for this frequency. Other equivalent parts may be substituted as needed to operate the receiver at RF or other IF frequencies.

Although in the preferred embodiment (FIG. 1) the phase detector 16 is coupled to the outputs of limiters 12 and 14, this is not essential to the present invention. Detector 16 may alternatively be coupled to outputs 22 and 24 of hybrid 20 to provide direction information. When detector 16 is so coupled its output 17 has a different form, but when it is fed to comparator 18, the digital output 19 is the same as with the connections shown in FIG. 1.

Although the present invention has been shown and described in terms of specific apparatus, it will be apparent that changes or modifications can be made without departing from the scope of the invention as defined by the appended claims.

What is claimed is:

1. A monopulse receiver for processing signals received from a target by a monopulse antenna comprising:

a first signal processing means coupled to the output of the monopulse antenna for receiving sum and difference signals from said antenna and for generating equal amplitude outputs having a phase difference proportional to the amplitude difference of said sum and difference signals, amplifier means coupled to the output of said first signal processing means for generating signals having a preselected amplitude and the same phase difference as said first signal processing means outputs, second signal processing means having an input coupled to the output of said amplifier means for generating outputs having the same amplitude ratio as said sum and difference signals, and subtractor means coupled to the output of said second signal processing means for providing an output proportional to the amplitude difference of said second signal processing means outputs.

2. A monopulse receiver according to claim 1 further including phase detecting means coupled to the output of said amplifier means for providing an output related to the phase difference of said amplifier means outputs.

3. A monopulse receiver according to claim 1 wherein said first signal processing means is a 90° hybrid.

4. A monopulse receiver according to claim 1 wherein said amplifier means comprises a pair of limiter amplifiers.

5. A monopulse receiver according to claim 1 wherein said second signal processing means is a 90° hybrid.

6. A monopulse receiver according to claim 1 wherein said subtractor means comprises amplitude detectors coupled to the outputs of said second signal processing means for providing video outputs proportional to the amplitudes of said second signal processing means outputs, and a differential amplifier coupled to the output of said amplitude detectors for providing an output proportional to the difference between said amplitude detector outputs.

7. A monopulse receiver for processing signals received from a target by a monopulse antenna comprising:

a first hybrid circuit having two inputs for receiving sum and difference signals from a monopulse antenna, said hybrid having two outputs for providing output signals in response to signals received at its inputs;

two limiter amplifiers each coupled to one output of said first hybrid, and each having an output for providing a signal having constant amplitude for an operational range of input signal amplitudes, said outputs having a phase difference substantially equal to the phase difference of said first hybrid output signals, a second hybrid circut having two inputs coupled to said limiter amplifier outputs and having two outputs for providing signals having amplitudes related to the relative amplitudes of the signals received by the inputs of the first hybrid circuit; and subtractor means coupled to the two second hybrid outputs for providing an output proportional to the amplitude difference between said two outputs, said subtractor means output substantially linearly proportional to the angle from boresight of the target.

8. A monopulse receiver according to claim 7 wherein said subtractor means comprises two amplitude detectors each coupled to an output of the second hybrid for providing video outputs proportional to the amplitudes of the outputs of the second hybrid; and a differential amplifier coupled to said two amplitude detectors for providing an output proportional to the difference between said amplitude detector outputs.

9. A monopulse receiver according to claim 7 further including a phase detector coupled to the output of said limiter amplifiers for comparing the relative phase of the limiter amplifier outputs and providing an output indicative of the location of a target relative to the antenna boresight.

10. A monopulse receiver for processing signals received from a target by a monopulse antenna of the class wherein sum and difference signals from said antenna are coupled to a first hybrid circuit which combines said signals to provide equal amplitude outputs which are coupled to inputs of two limiter amplifiers to be amplified to a preselected amplitude level and said limiter outputs are coupled to a phase detector which provides an output indicative of target location relative to boresight, the improvement comprising a second hybrid circuit having two inputs coupled to said limiter outputs and two outputs for providing signals having relative amplitudes related to the relative amplitudes of the signals coupled to said first hybrid, two amplitude detectors coupled to said second hybrid outputs and subtractor means coupled to said amplitude detectors for providing an output proportional to the difference between said amplitude detector outputs, said output substantially linearly proportional to the angle of target position from boresight.

11. A method for processing a signal received by a monopulse antenna from a target comprising:

generating equal amplitude signals having a phase difference proportional to the target angle from antenna boresight by feeding sum and difference antenna pattern outputs to a first hybrid, generating fixed amplitude signals having said phase difference proportional to target angle from antenna boresight by feeding said first hybrid outputs to a pair of limiter amplifiers, generating two signals whose amplitude difference is proportional to angle from antenna boresight of the target by feeding said limiter amplifier outputs to a second hybrid, and detecting the amplitude difference of the second hybrid outputs.

12. A method according to claim 11 including the step of generating a signal indicative of the side of antenna boresight on which the target is located by feeding the limiter amplifier outputs to a phase detector.

* * * * *